UNITED STATES PATENT OFFICE.

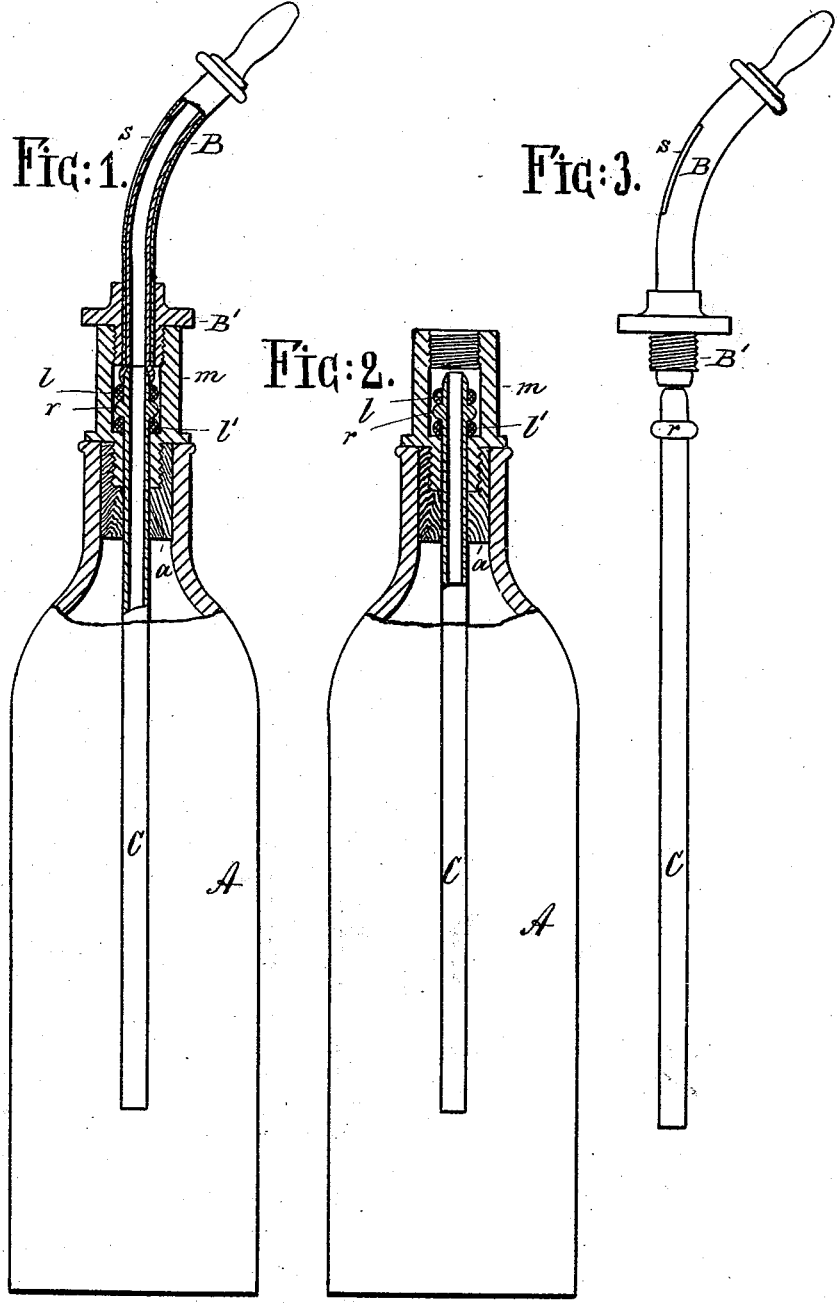

RICHARD TURCK, OF LÜDENSCHEID, GERMANY.

NURSING-BOTTLE.

SPECIFICATION forming part of Letters Patent No. 514,974, dated February 20, 1894.

Application filed February 11, 1893. Serial No. 461,975. (No model.)

*To all whom it may concern:*

Be it known that I, RICHARD TURCK, a subject of the German Emperor, residing at Lüdenscheid, Germany, have invented certain new and useful Improvements in Nursing-Bottles, with description as follows.

This invention relates to a nursing bottle so constructed that the milk comes only into contact with glass and that the feed tubes may be readily inspected and removed to be cleaned.

In the accompanying drawings: Figure 1 is a longitudinal section partly in elevation of my improved nursing bottle. Fig. 2 is a similar section with the upper feed tube removed and Fig. 3 an elevation of the feed tubes.

The letter A, represents the nursing bottle provided with a perforated cap or stopper $a$. To this stopper there is secured, by a screw thread or otherwise, the lower end of a tubular coupling sleeve $m$. The upper end of this sleeve is threaded for the reception of a threaded collar $B'$ carried by the upper feed tube B. The lower feed tube C, projects through the perforated stopper $a$, into the sleeve $m$, and is there provided with a head or enlargement $r$, by which it is suspended. Leakage may be prevented by washers $l$, $l'$, placed into sleeve $m$, above and below the head $r$. The upper end of the lower tube is reduced and inserted into the expanded lower end of the upper tube, so that the milk is conveyed directly from one tube into the other.

It will be seen that the milk comes into contact with glass only and does not touch the coupling. Moreover, as the coupling is placed outside of the bottle, it is readily accessible and permits the tube to be easily removed and cleaned.

The upper tube B, is protected by a jacket or covering of tin or other material which is cast around the tube. Through this jacket, I form a slit $s$, to permit inspection of the tube and to ascertain whether the milk is properly fed to the infant.

What I claim is—

The combination of bottle A with a threaded sleeve $m$, an upper feed tube having a flaring mouth and a collar that engages such sleeve, and with a lower feed tube having a head $r$ and a reduced upper end, that is received by the flaring mouth of the upper tube, substantially as specified.

In testimony whereof I have signed this specification in the presence of two subscribing witnesses.

RICHARD TURCK.

Witnesses:
 HANS FRIEDNITZ,
 AUG. V. PAPEN.